Nov. 3, 1953    A. H. QUIGLEY    2,657,820
MESS KIT
Filed Aug. 16, 1950
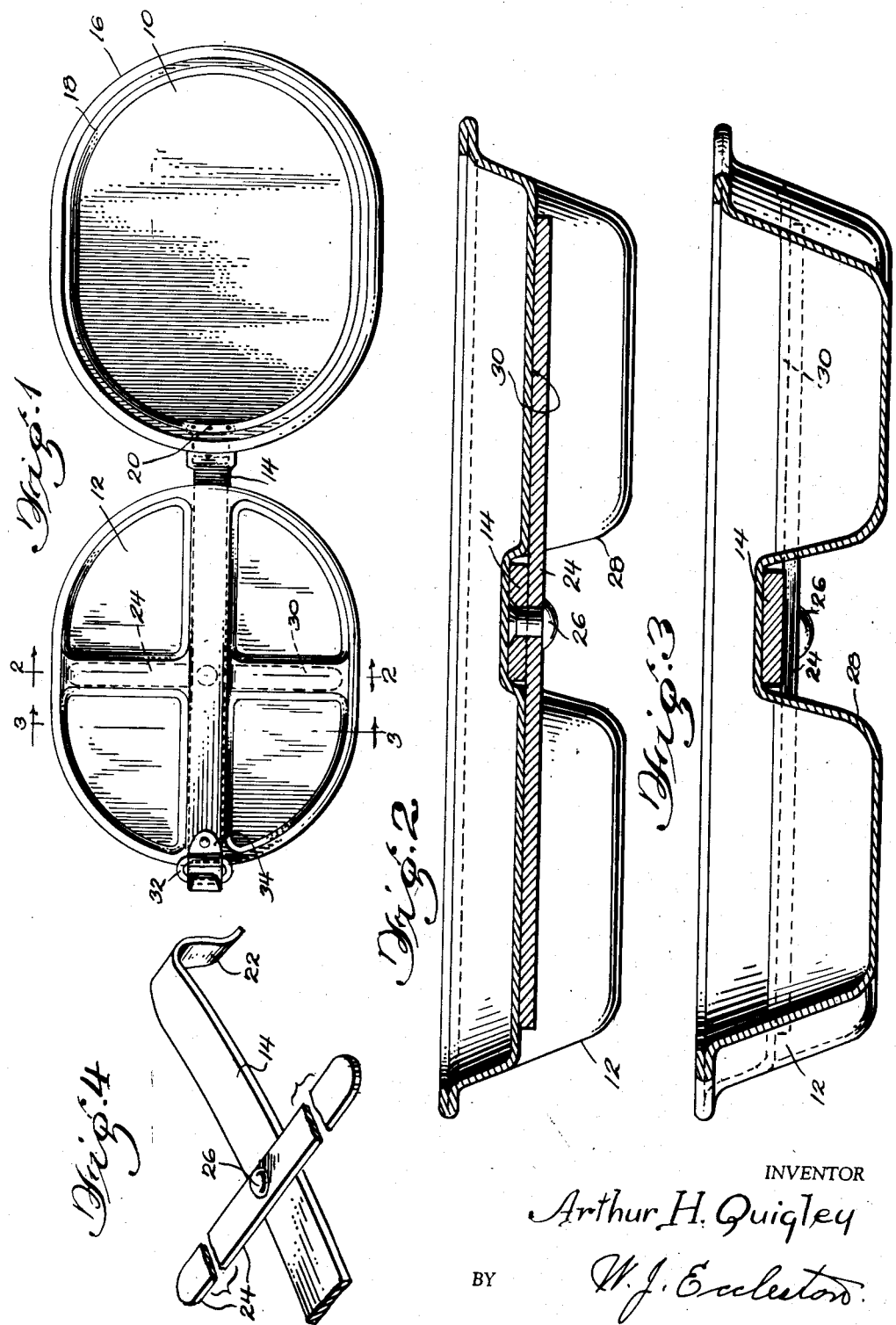
INVENTOR
Arthur H. Quigley
BY W. J. Eccleston
ATTORNEY Patented Nov. 3, 1953

2,657,820

UNITED STATES PATENT OFFICE 2,657,820

MESS KIT

Arthur H. Quigley, Baltimore, Md.

Application August 16, 1950, Serial No. 179,759

4 Claims. (Cl. 220—4)

The present invention relates to mess kits, and more particularly, to a mess kit incorporating means for balancing the cover thereof on the handle when the cover is being used as an auxiliary pan.

So-called mess kits of the type used by the Armed Forces consist of a pan and a dished cover for the pan which cover may also be used as an auxiliary pan. The pan has an elongated handle hingedly secured thereto by means of which it may be handled when the handle is swung to extended position, and a longitudinal recess is provided in the outwardly facing side of the cover adapted to receive the handle. Thus the cover may be locked on the pan by the handle when the latter is swung into a longitudinally coextensive position relative to the pan. When the handle is in extended position the cover may be supported thereon by engaging the recessed part thereof on the handle so that the cover may be used as an auxiliary pan while in this position.

However, difficulty is encountered in balancing the cover in this position when unequal loads are placed on opposite sides of the recess therein. Ordinarily, since the user will be holding a canteen cup in one hand, with the other hand, he must both hold the mess kit and attempt to balance its cover. Much experience in the use of these mess kits has shown that this is usually impossible, and although it may be possible for a user to hold the cover so that it does not tip far enough to cause the entire contents to be spilled from the cover, still a portion of the contents is almost certain to be spilled when a conventional mess kit is being used. The present invention is concerned with a means for obviating this disadvantage of conventional mess kits.

Accordingly, an object of the invention is to provide a new and improved mess kit incorporating means for balancing the cover thereof on the handle when it is desired to use the cover as an auxiliary pan.

Another object of the invention is to provide a new and improved mess kit in which a cleat on the handle and a transverse recess in the cover are provided which may be brought into cooperative relationship when the cover is placed on the handle to balance the cover thereon.

A further object of the invention is to provide a new and improved mess kit, as specified in the preceding objects, which is inexpensive to manufacture, more sturdy than the conventional mess kits and entirely satisfactory in use.

These and other objects, advantages and capabilities of the invention will become apparent from the following description wherein reference is had to the accompanying drawing in which, Fig. 1 is a top plan view of the improved mess kit of the present invention showing the cover of the mess kit balanced on the handle for use as an auxiliary pan;

Fig. 2 is a vertical transverse sectional view taken on the line 2—2 of Fig. 1;

Fig. 3 is a vertical transverse sectional view taken on the line 3—3 of Fig. 1; and Fig. 4 is a fragmentary perspective view showing a portion of the handle of the improved mess kit with a cover balancing cleat attached thereto.

Referring to the drawing, it will be seen that the mess kit of the present invention which is preferably made from aluminum or an aluminum alloy comprises a pan 10, a cover 12 for the pan and a handle 14 hinged to the pan. The pan 10 which may be of conventional construction has a bead 16 along its peripheral edge and a shoulder 18 inside this bead upon which the peripheral edge of the cover rests when it is being used as such, this edge of the cover likewise being beaded but not shouldered.

A hinge knuckle 20 is riveted to one end of the pan 10 upon the longitudinal center line thereof, and the handle 14 is hinged to this knuckle so that it may be swung from a position at which it extends transversely of the pan 10 along the longitudinal axis of the latter to a position at which it projects laterally therefrom as shown in Fig. 1. In this latter position the handle may be used for holding the pan. At its free end the handle 14 is hooked as indicated at 22 (Fig. 4) to engage over the bead 16 on pan 10 when the handle is in the first-mentioned position releasably to lock the handle at that position.

At its mid-point a cleat 24 is pivotally secured to an intermediate part of the handle 14 by means of a rivet 26 or the like. This cleat preferably is somewhat shorter in length than the maximum width of the cover 12, and its is pivotable between a position in which it extends coextensively with the handle 14 and a position normal thereto (Fig. 4) for a purpose to be described.

The outwardly facing side of the cover 12 is recessed from edge-to-edge upon its longitudinal and transverse axes to provide intersecting longitudinal and transverse grooves 28 and 30 respectively which are adapted to receive the handle 14 and cleat 24 respectively. A D-ring 32 secured to one end of the cover 12 by means of a clasp 34 is provided for suspending the cover 12 from the handle 14 when the cover and pan are being rinsed, for example, and for other purposes.

Since the pan 10 and cover 12 are oval shaped in plan, assurance is had that the axis of longitudinal groove 28 in the cover and the longitudinal axis of the pan 10 and handle 14 will always lie in the same plane when the cover is placed on the pan. Thus with the cover 12 in position on pan 10, the handle 14 may be swung into longitudinally coextensive relation to the pan and cover at which position the longitudinal groove 28 receives the handle. By pressing on the handle sufficiently the hook 22 may be snapped over bead 16 releasably to lock the handle in this position and the cover upon the pan.

When it is desired to use the cover 12 as an auxiliary pan with the main pan the handle 14 is swung to extended position (Fig. 1) and the cleat 24 swung to a position normal to the handle. The cover 12 is then placed on the handle 14, the groove 28 receiving the handle 14 and the groove 30 receiving the cleat 24. In placing the cover on the handle the D-ring 32 ordinarily is slipped over the handle 14, as shown in Fig. 1. It thus assists somewhat in preventing the cover from slipping off the handle. However, the cover is balanced on the handle by the cleat 24 engaged in the transverse groove 30.

Normally, when the handle 14 is used to lock the cover in closed position, the cleat 24 will be swung into coextensive relation with the handle. However, since it is of less length than the maximum width of pan 10 or cover 12 it is not essential that the cleat be swung to this position before locking the cover since the cleat is short enough so that it will not project beyond the lateral edges of cover 12 either when the cover is balanced on the handle or is locked in closed position by the handle.

From the above description of the construction and operation of the improved mess kit, it will be noted that a greatly improved construction has been provided at very little added cost over conventional mess kits. Furthermore, this improved mess kit is just as sturdy and reliable as conventional mess kits. As a matter of fact, the presence of transverse groove 30 in the cover 12 serves to rigidify the same and thus constitutes an additional advantage of this construction.

While a preferred embodiment of the invention has been shown and described, it will be apparent that numerous variations and modifications thereof may be made without departing from the underlying principles of the invention. It is desired, therefore, by the following claims, to include within the scope of the invention, all such variations and modifications by which substantially the results of the invention may be obtained through the use of substantially the same or equivalent means.

I claim:

1. A mess kit comprising a pan, a dished cover for said pan, an elongated handle hinged to one end of said pan, said dished cover having an axially disposed first recessed portion extending from end to end of said cover and a second recessed portion intersecting said first recessed portion at a right angle, and an auxiliary support mounted on said handle intermediate the ends of said handle and at a distance from the hinged end of said handle at least equal to the distance from the intersection of said first and second recessed portions on said cover to an end of said first axially disposed recessed portion, said handle interfitting with said axially disposed first recessed portion of said cover, and said auxiliary support interfitting with said second recessed portion of said cover; whereby when said mess kit is in use, said cover may be placed on said handle and auxiliary support in securely supported position.

2. A mess kit comprising a pan, a dished cover for said pan, an elongated handle hinged to one end of said pan, said dished cover having an axially disposed first recessed portion extending from end to end of said cover and a second recessed portion intersecting said first recessed portion at a right angle, and an auxiliary support pivoted to said handle intermediate the ends of said handle at a pivot point whose distance from the hinged end of said handle is at least equal to the distance from the intersection of said first and second recessed portions on said cover to an end of said first axially disposed recessed portion, said handle interfitting with said axially disposed first recessed portion of said cover, and said auxiliary support being swingable from a position lapping said handle to an operative position intersecting said handle at a right angle and interfitting with said second recessed portion of said cover while in said operative position; whereby when said mess kit is in use, said auxiliary support may be swung into operative position and said cover may be placed on said handle and auxiliary support in securely supported position.

3. A mess kit comprising a substantially oval pan, a substantially oval dished cover for said pan, an elongated handle hinged to one end of said pan, said dished cover having an axially disposed first recessed portion extending from end to end of said cover and a second recessed portion midwise intersecting said first recessed portion at a right angle and extending at either end to the rim of said cover thereby dividing said cover into four food compartments, and an auxiliary support mounted on said handle intermediate the ends of said handle and at a distance from the hinged end of said handle at least equal to one-half the length of the longitudinal axis of said cover, said handle interfitting with said axially disposed first recessed portion of said cover, and said auxiliary support interfitting with said second recessed portion of said cover; whereby when said mess kit is in use, said cover may be placed on said handle and auxiliary support in securely supported position.

4. A mess kit according to claim 3, wherein said auxiliary support is pivoted to said handle at a pivot point spaced from the hinged end of said handle for a distance at least equal to one-half the length of the longitudinal axis of said cover, said auxiliary support being swingable from a position lapping said handle to an operative position intersecting said handle at a right angle.

ARTHUR H. QUIGLEY.

References Cited in the file of this patent

UNITED STATES PATENTS

| Number | Name | Date |
|---|---|---|
| 163,359 | Chambers | May 18, 1875 |
| 179,471 | Campbell | July 4, 1876 |
| 1,021,640 | Steitler | Mar. 26, 1912 |
| 1,169,560 | Murray | Jan. 25, 1916 |
| 1,338,486 | Burdick | Apr. 27, 1920 |
| 1,605,215 | Carr | Nov. 2, 1926 |